United States Patent [19] [11] 4,116,660
Zortea [45] Sep. 26, 1978

[54] PRODUCTION OF FLAT GLASS

[75] Inventor: Michel Zortea, Chalon sur Saone, France

[73] Assignee: Saint-Gobain Industries, Neuilly-sur-Seine, France

[21] Appl. No.: 817,047

[22] Filed: Jul. 19, 1977

[30] Foreign Application Priority Data

Jul. 23, 1976 [FR] France ................................ 76 22581

[51] Int. Cl.[2] ................................................ C03B 18/02
[52] U.S. Cl. .................................. 65/99 A; 65/182 R
[58] Field of Search ................. 65/65 A, 99 A, 182 R

[56] References Cited

U.S. PATENT DOCUMENTS 3,413,107 11/1968 De Lajarte et al. ................ 65/65 A
3,576,612 4/1971 Prislan ................................ 65/182 R

FOREIGN PATENT DOCUMENTS 788,837 9/1972 Belgium.
1,206,044 8/1959 France.
1,365,886 5/1964 France.
1,365,937 5/1964 France.
1,378,831 10/1964 France.
1,378,839 10/1964 France.
86,222 11/1965 France ..................................... 65/99 A
86,817 3/1966 France.
1,445,180 7/1966 France.
2,254,525 11/1975 France.
638,874 4/1962 Italy ....................................... 65/182 R
438,619 8/1974 U.S.S.R. ................................. 65/99 A

*Primary Examiner*—Arthur D. Kellogg
*Attorney, Agent, or Firm*—Pennie & Edmonds

[57] ABSTRACT

An improvement in the method and apparatus for the production of that glass by the float glass method wherein molten glass is poured into a bath of molten metal, caused to float along the top of the bath, and after being sufficiently hardened, drawn off of the bath. The improvement included the use of a connecting member emerging from the molten metal bath at the upstream end thereof for receiving the falling glass before it enters the bath. The connecting member has a forward surface inclined in the direction of movement of the glass in the bath. This gives the glass a component of movement in this direction to accelerate it to a velocity compatible with the velocity of movement of the glass at the exit end of the bath. The contact of the falling glass with the connecting member before the glass passes into the surface of the bath also reduces agitation of the glass.

27 Claims, 9 Drawing Figures

13'
15
16
17
29
30
31
32
33
V
f
f'

PRODUCTION OF FLAT GLASS

BACKGROUND OF THE INVENTION

One process for the production of flat glass involves pouring molten glass from a melting furnace onto a bath of molten metal having a specific gravity greater than that of the glass. The glass forms a sheet which is made to move forwardly along the bath. During this movement, it is cooled and finally removed at the downstream end as a solidified strip having a definite width and thickness.

According to French Pat. No. 1,206,044 which is the basis of the float glass method, the only industrial one today, the molten glass is poured from the discharge or transfer unit of the melting furnace so that it can fall freely onto the molten metal bath. Actually the molten glass then spreads out backwards as well as laterally and forwards, the backward stream returning subsequently on the sides. This process has the advantage of systematically eliminating the glass that may have become contaminated by contact with the discharge or transfer unit which is made of refractory material. Since this glass fraction spreads out towards the outside of the marginal parts of the finished product it can be conveniently separated from the rest and removed. This process has made it possible to prepare glass strips having a thickness close to 6 mm, which is an equilibrium thickness resulting from surface stresses. These strips show good optical qualities, due to physico-chemical homogeneity and a satisfactory surface quality, for most commercial applications.

Commercial needs also require increasing quantities of glass with thicknesses smaller than the equilibrium thickness. This is so, for example, in the automotive industry. In the production of windshields, the thickness ranges from approximately 1.5 to 3.8 mm and is preferably around 2.3 mm. In the building industry, on the other hand, glass with thicknesses greater than the equilibrium thicknesses are required.

Through the use of various expedients and improvements, it has been possible to use the basic float process for the production of thin and thick glasses; to this end, a gradual stretching is effected on the bath surface so as to reduce the thickness of the glass, or on the contrary, the edges of the sheet are contained in order to obtain a thicker strip. However, as values are gradually further removed from the equilibrium thickness, in particular, starting at thicknesses of the order of a little less than 3.8 mm, it can be noted that the glass produced by the float process shows a greater optical distortion and that serious difficulties are encountered in the production of such a thin glass while maintaining adequate optical properties to satisfy the required conditions, in particular, for automobile windshields. It seems that this difficulty can be attributed to a large extent to the substantial agitation of the glass induced by the pouring method.

A process is also known in which, on the contrary, every effort is made to rapidly impart to the glass sheet poured on the bath, its final thickness and width by rapidly drawing it out in the direction of its width using continuous lateral guiding members. This process makes it possible to use shorter baths and has the advantage of greater production flexibility. Different embodiments of this process are described in the second and third additions 86,222 and 86,817 to French Pat. No.

1,378,839. Although it thus becomes possible to produce a glass strip having a thickness different from the equilibrium thickness, excellent optical quality still remains difficult to obtain and for reasons quite similar to those discussed above.

It has also been contemplated to form the glass sheet by simply flowing the molten glass over various sills of large width whether or not provided with an inclined plane descending to the tin bath. However, because of the small height of fall, the proposed solutions, as a whole, are not freed of the requirement of stretching the glass sheet on the surface of the bath as soon as its thickness is less than the equilibrium thickness. In addition, they have the disadvantage of very easily giving rise to defects such as bubbles on the lower face of the glass strip.

SUMMARY OF THE INVENTION

The present invention relates to an improved method and apparatus which combines various characteristics of previous systems but makes it possible to obtain, with a great flexibility, glass strips of variable thicknesses, having good physico-chemical homogeneity and therefore, good optical quality. This is accomplished by limiting to the strict minimum both the agitation of the glass when it is being poured onto the molten metal bath and by also limiting the stretching of the sheet as it is being stabilized and cooled on the surface of the metal.

In accordance with the invention, the glass mass taken from the melting furnace is poured as a thin vein having a width substantially equal to that of the desired glass strip. This pouring is effected by flowing the glass along an inclined over-flow-shoot at the exit of a channel extention to the furnace and allowing it to fall freely onto a connecting member which emerges from the metal bath. The connecting member has an inclined surface facing the direction of movement of the glass along the surface of the molten metal bath. The glass can thus receive, for a small thickness, a sufficient acceleration to reach a velocity which is only slightly less than the exit velocity of the strip from the bath.

The glass sheet is guided on its edges as soon as it is formed on the surface of the bath and at least in the entire upstream part of its path over the latter so as to maintain its longitudinal edges at a substantially constant spacing along its path of movement from the connecting member up to a point where the glass strip leaves the path. According to the invention the means for guiding and maintaining the glass vein are introduced into the longitudinal edges of said vein at a given height through the connecting member. In the preferred embodiment, a wire made of refractory material is introduced into each of the edges of the glass vein upon its arrival on the connecting member and accompanies it during its progression on the bath. Therefore, as soon as the glass comes into contact with the metal of the bath, it has dimensions which are practically final. It is only for productions of extremely thin strips having a thickness which can be as low, for example, as 1 mm, that it is necessary to effect a substantial stretching on the surface of the bath, which stretching is, however, much less than that required by the previous processes.

According to another characteristic of the invention, the temperature of the glass is adjusted longitudinally and crosswise during its entire flow along the overflow chute and until its contacts the metallic bath. For this purpose, the overflow-shoot and connecting member are provided with thermal conditioning means which make it possible to maintain them at average given temperatures and to adjust the temperatures in the central zone and the marginal zones of the vein independently from one another so as to adjust and homogenize the flow.

The temperature of the bath is also set in a manner so as to allow the regularization of the sheet and its cooling with a view to the removal of the strip downstream of the bath. For this purpose, exist heating and cooling means located in the dome and in the metal bath designed to cool the glass strip after possibly causing it to be subjected to a temperature plateau or warming up and means designed to remove the continuous glass strip from the surface of the molten metal bath. It is thus possible to adjust the velocities of flow of the glass over the entire width of the device.

The longitudinal position of the connecting member can be adjusted with respect to the nose of the overflow-shoot. This makes it possible to either direct the entire glass vein towards the downstream end of the molten metal bath, or to direct only its upper layers towards the downstream end of the bath, while removing the lower layers. This is advantageous for the production of very high quality optical glass or even of very thin glass. With high quality optical glass, the homogeneity of the glass takes on a special importance; and the elimination of the glass layers which have come into a relatively prolonged contact with the refractory material improves this homogeneity. On the other hand, in the production of very thin glass, the decrease in the initial thickness of the sheet on the bath makes it possible to decrease the stretching on the surface of the latter.

At the two ends of the connecting member are located adjustable, heated casting hands. These casting hands have several functions: first of all, they make it possible to accurately define the width of the glass vein; secondly they can control the temperature and thus the differences in fludity of the glass across its width so as to, in turn, control flow between the center and the edges of the glass. Finally, they can contain wire guides which make it possible to easily introduce the guide wires mentioned previously.

DESCRIPTION OF THE PREFERRED EMBODIMENT

The melting furnace in which the molten glass is originally formed is of a conventional construction.

Figure 1:
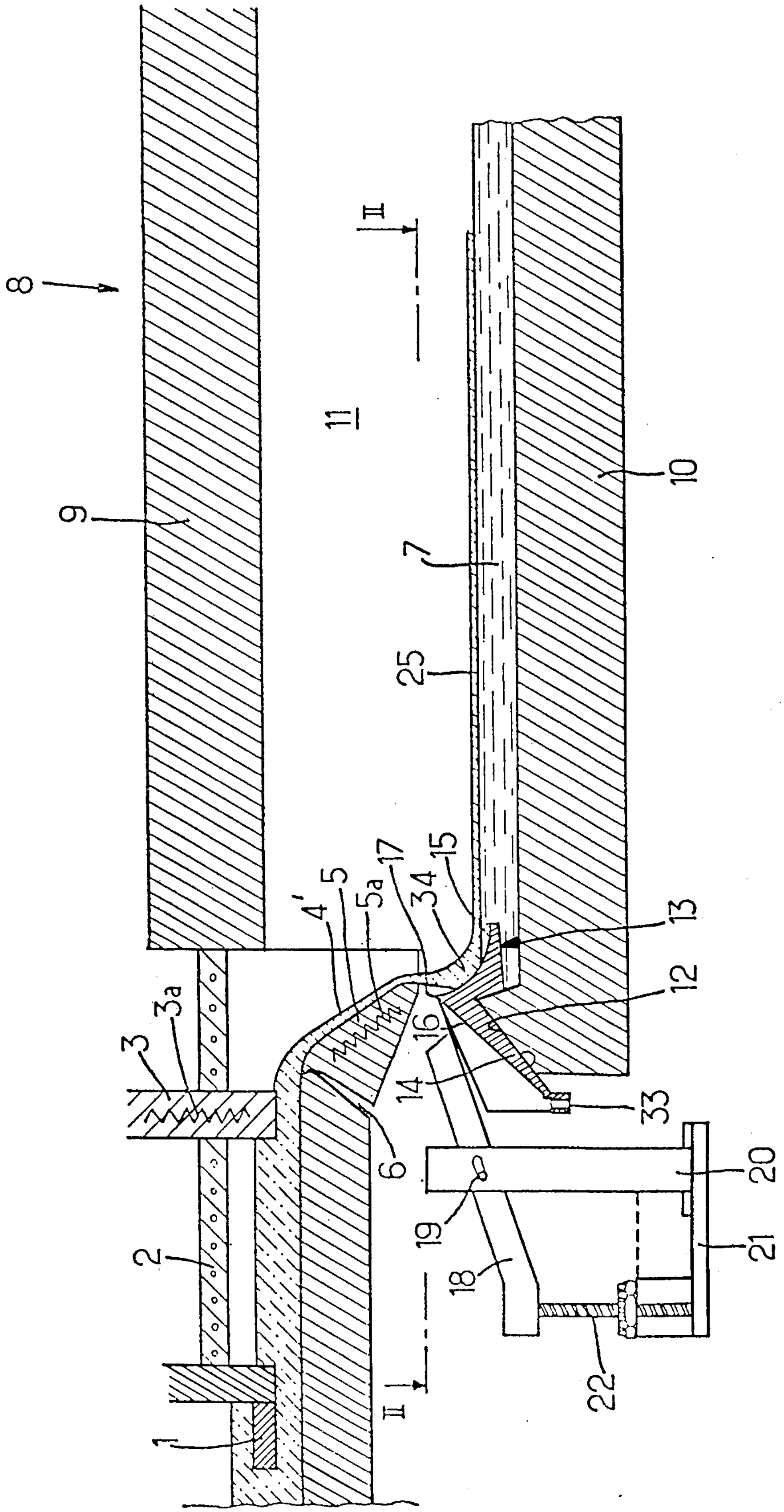
FIG. 1 is a sectional view of the overflow-shoot and of the upstream part of the floating bath.
Figure 2:
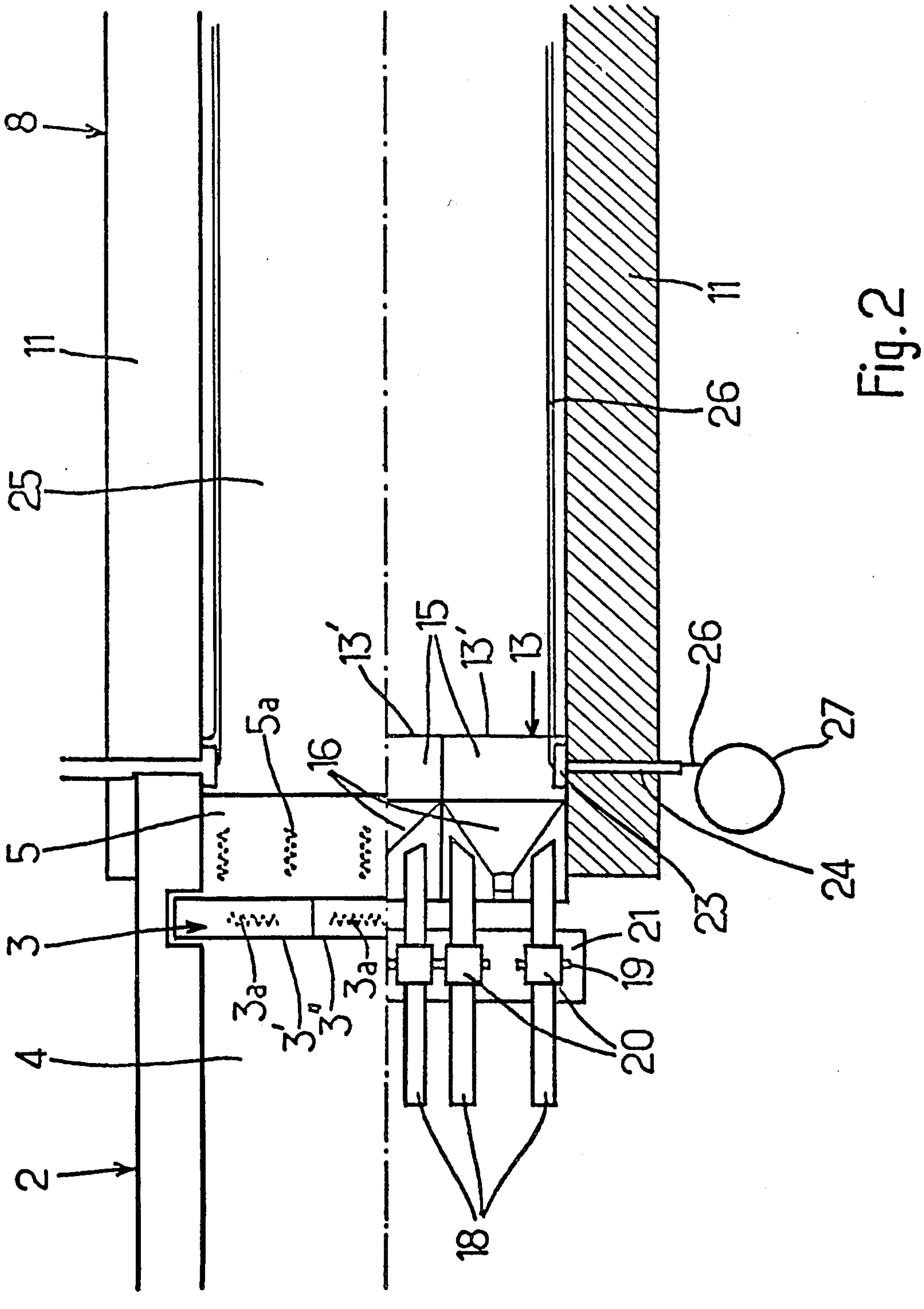
FIG. 2 is a partial sectional plan view along line II—II of FIG. 1.

Removal of the glass from the furnace is advantageously carried out using the process described in French Pat. No. 1,378,831 and in French Pat. No. 2,254,525. Generally, a glass vein is taken from the melting furnace in a conditioning zone of the molten bath the width of which is at least equal to, and preferably greater than, that of the strip which is to be formed. In the removal zone, the temperature of the glass ranges from 1150° to 1200° C for an industrial sodium-calcium glass and, preferably, a chemically and thermally homogeneous vein is removed selectively from within the glass bath using a horizontal drain made of refractory material. This removal is isokinetic, i.e., it preserves for the vein all the characteristics it had in the furnace. In addition, the passage of the glass through such a drain facilitates its thermal conditioning while refining is completed. The transfer of the glass vein to the forming zone occurs in a channel providing for the thermal control of the vein according to known techniques. The width of this channel is equal to the width of the finished glass strip. FIGS. 1 and 2 show only drain 1 located on the downstream part of the furnace and the channel 2. Both are made of refractory material and provided with adequate conditioning means, not shown. At the downstream end of channel 2 is mounted a register 3 which can slide in a vertical plane under the action of motive means, not shown.

As shown clearly in FIG. 1, lowering or raising register 3 to a larger or smaller extent, controls the thickness, i.e., the flow rate of glass vein 4' which flows to form the glass strip. Register 3, also made of refractory materials and having a width equal to the width of channel 2, can advantageously consist of several components placed side by side, each having its own motive means for adjustment. In the example shown in FIG. 2, the register comprises three components only two of which, 3' and 3'' can be seen. Each of these components comprises thermal conditioning means shown schematically at *3a*, designed to provide a differential adjustment of the temperature of register 3 between its central and lateral components. Thus, it is possible to adjust the thickness of the glass vein in a differential manner between the center and the edges so as to correct small difference in thickness which, without such a precaution, might eventually be noted on the finished product.

The bed plate of channel 2 is extended at its downstream end by an overflow-shoot 5 formed by a plane inclined by approximately 40° to 50°, the width of which is equal to that of channel 2 and therefore corresponds closely to that of the desired glass strip. This overflow-shoot, made of refractory materials such as Monofrax, electro-melt or a refractory metal, is adjustable in its inclination through a connecting joint 6. It can also consist of several components placed side by side with each component containing thermal conditioning means *5a* to provide for a differential adjustment of the temperature of the overflow-shoot and therefore of the glass flow between its center and edges.

The vein 4' passing through register 3 flows by gravity along overflow-shoot 5 and undergoes in this path a dynamic lamination depending on the inclination of the overflow-shoot and its temperature, which ranges from 1050° to 1150° C. The lamination is followed by a free fall from a small height the result of which is to bring the thickness of vein 4' to a value close to the desired final thickness.

The molten metal bath 7 is contained in an enclosure 8 comprising a roof 9, a tank 10 and lateral walls 11.

Thermal conditioning means, not shown, are arranged on the bottom of the enclosure and through the lateral walls. At the upstream end of the bath, tank 10 comprises an inclined plane 12 on which a connecting member 13 rests. The lower face 14 of the connecting member which rests on the inclined plane 12 is also inclined. The connecting member extends over the entire width of bath 7 and partially emerges from the bath. This connecting member, made of refractory material, comprises a downstream or forward surface 15, which is concave and inclined forward in the direction of movement of the glass over the surface of the molten metal bath. The connecting member also has an upstream surface 16 which is inclined backwards. Surfaces 15 and 16 intersect along a horizontal ridge 17, which is rectilinear and parallel to the end part of overflow-shoot 5.

The surface 15 of the connecting member, by being inclined in the direction of flow of the glass in the bath and by emerging from the bath at the point where the falling glass will strike it, accomplished two important things. First, it gives the freely falling glass a component of movement in the direction of flow of the glass on the bath. This results in significant acceleration of the glass in this direction so that its velocity as it transfers onto this surface of the bath is equal to or nearly equal to the velocity of the glass as it exits downstream on the bath. Thus no stretching of the glass is required as it is stabilized on the bath. In addition to the acceleration and velocity component, the inclined surface 15 of the connecting member receives the falling glass before the glass comes in contact with the molten metal of the bath. This initial contact with the connecting member together with the change in direction of the glass effected by the connecting member reduces to a minimum any agitation of the glass that would otherwise occur if the glass fell directly into the molten metal.

According to the invention, the connecting member is adjustable in the longitudinal direction of movement of the glass along the surface of the bath so that the position of its upper ridge can be adjusted with respect to the nose or downstream end of the overflow-shoot. This adjustment can be advantageously made along an inclined plane 12 which extends substantially perpendicular to that of the overflow-shoot.

FIG. 2 shows that the connecting member 13 is constructed of component parts 13' onto each of which a pressing action is exerted by pressure arms 18. The arms are pivotally mounted, through axes 19, on beams 20 fastened to a screw plate 21. Screw members 22 engage the back ends of arms 18 to pivot them around the axes 19 and down into pressure contact with the component parts 13'.

By loosening the screw means 22, it is possible to adjust the position of components 13' of the connecting part with respect to the downstream end or nose of overflow-shoot 5. Adjustment is made by sliding the components forwards or backwards on the inclined plane 12. When the connecting part is in position, the screws are tightened to press the arms 18 onto components 13'.

Thus, the upper ridge 17 can be positioned sufficiently upstream with respect to the downstream end of the overflow-shoot so that the entire glass vein will flow downstream along the front surface of the connecting member. But is is also possible, by moving the connecting member forwards, to place its ridge under the end part of the overflow-shoot so that this ridge, acting as a knive, will separate and eliminate the rear or lower layers of the glass vein which mibht have been soiled upon contact with the overflow-shoot. The thus eliminated glass can be recovered and converted to a cullet while the glass flowing downstream has a homogeneity which imparts very good optical quality to the finished product. The upper ridge of the connecting part is preferably located at a distance ranging from 20 to 60 mm below the downstream end of the overflow-shoot while the latter is located at a height ranging from 40 to 100 mm above the metal bath.

When extra-thin glass is to be produced, the glass sheet must be subjected to an additional longitudinal stretching on the bath and, in that case, the connecting member acts as an anchoring point. The concave forward surface 15 enhances the mechanical fastening of the glass to this surface and the formation of a stretching bulb as is used in the glass stretching processes.

Figure 3:
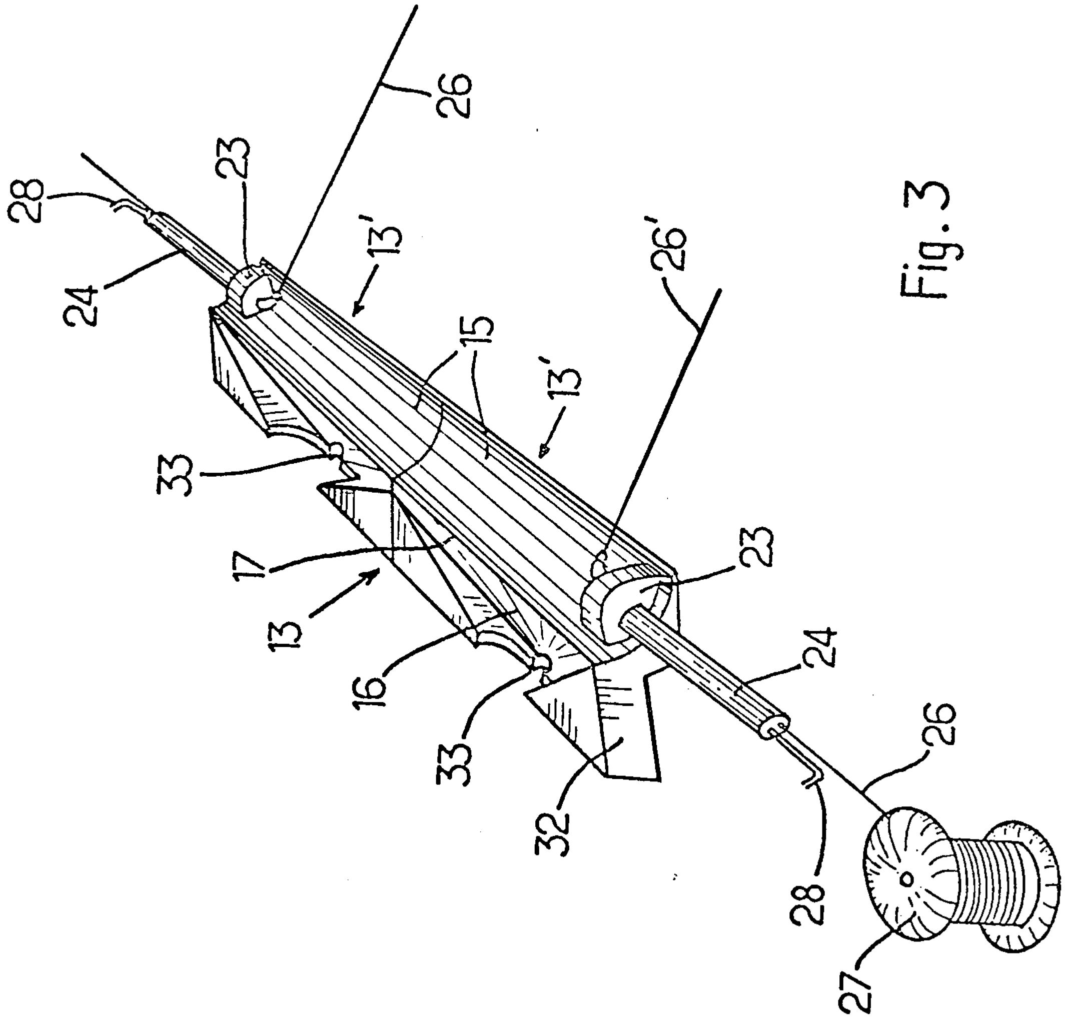
FIG. 3 is a perspective view of a connecting member with casting hands and guiding components.
Figures 4, 5, 6, 7, 8:
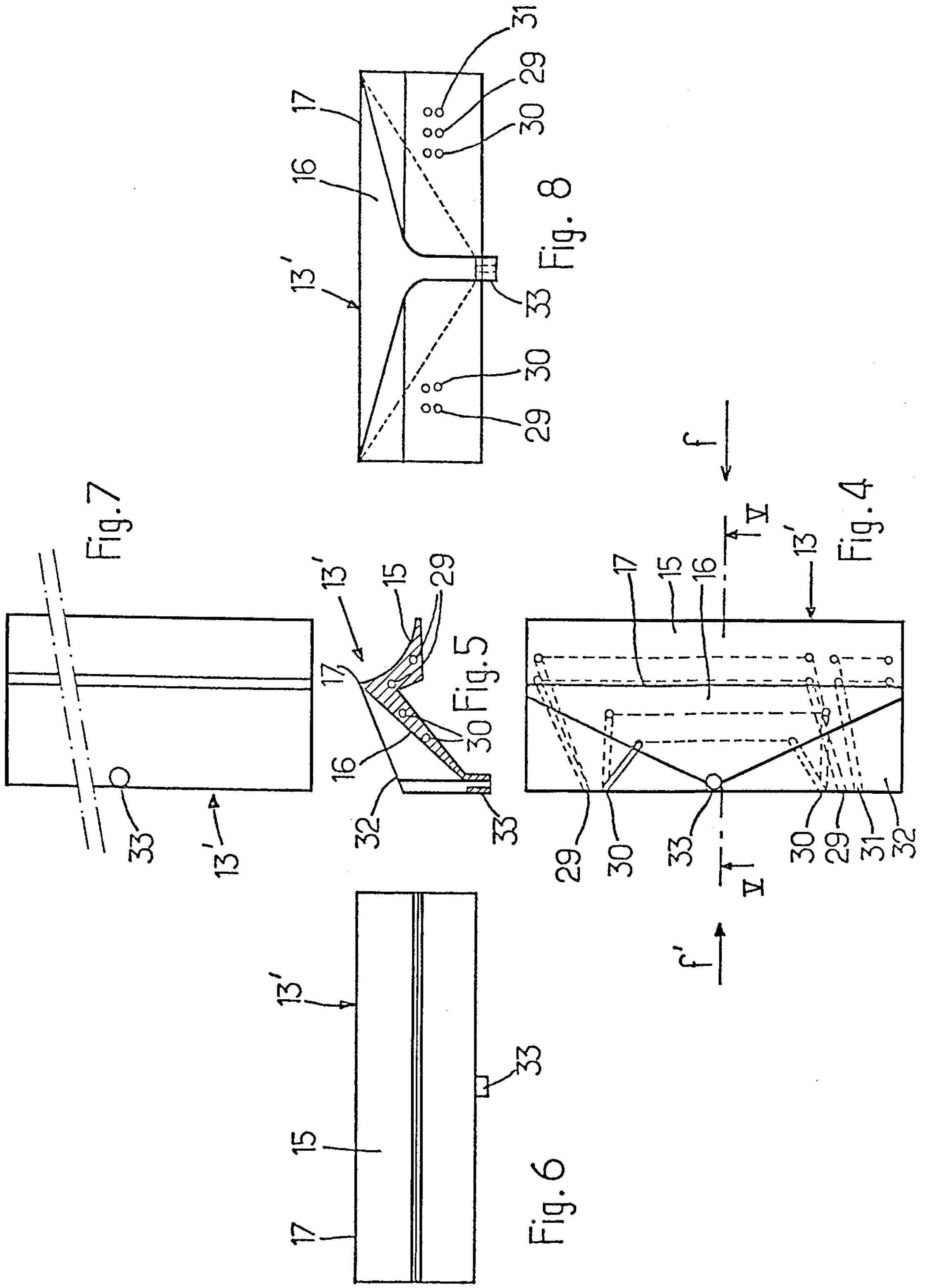
FIG. 4 is a top plan view of a constituent components of the connecting member.
FIG. 5 is a sectional view along line V—V of FIG. 4.
FIG. 6 is an elevational view of FIG. 4 in the direction of arrow f.
FIG. 7 is a bottom view of the constituent component.
FIG. 8 is an elevational view of FIG. 4 in the direction of arrow f'.

FIG. 3 shows in perspective and in detail a connecting member 13 formed by two components 13' placed side by side and having at each of its ends a casting hand 23 supported by an arm 24. These casting hands 23 are adjustable in the crosswise position and their spacing corresponds to the width of the overflow-shoot 5, which is itself practically identical to the width of the finished glass strip 25. The casting hands 23 and arms 24 provide for the introduction into the glass strip 25 of guidance and maintenance components such as wires 26 delivered by spools 27. Furthermore, casting hands 23 are thermally conditioned through internal electrical resistances 28 which make it possible to adjust the temperature of the edges of the glass strip 25.

As soon as the glass vein has arrived on the molten metal bath, it is guided by the wires 26 which are introduced into the upper part of each of the marginal edges of the glass strip so as to provide a constant and efficient guidance of this vein during its progression on the bath. This wire is preferably made of refractory steel. In the case in which the glass strip has a thickness greater than the equilibrium thickness of a sheet left free, these wires exert a complementary action which is opposed to lateral spreading of the glass, with resulting decrease in thickness, in the zone where the viscosity is still low. Conversely, in the case in which the glass vein has a thickness which is less than the equilibrium thickness, the wires oppose all constrictive stresses and the tendency of the glass to return to the equilibrium thickness by decreasing its width.

These wires can be maintained at the required spacing using fingers which cross the glass sheet but it is also possible to apply edge rollers to the edge of the strip according to a technique well known per se. These rollers can come into contact with the glass on each of the edges of the strip and inside the guiding wires. These wires can accompany the glass vein until the exit of the strip to the outside of the molten metal bath. The wires are then removed from the marginal zones of the strip. These wires can also be removed from the marginal zones as soon as the glass has reached a viscosity of $10^5$ to $10^6$ poises, which viscosity if sufficient to allow the strip to maintain its geometrical dimensions while allowing easy separation thus causing a minimum of damage to the edges.

It is desired to produce glass at the equilibrium thickness, the introduction of wires into the marginal zones of the strip is not necessary since the glass vein upon its arrival on the molten metal bath maintains its thickness. But the presence of these wires provides for efficient guidance of the strip and, when the installation is put onto operation, for a particularly easy start up.

As shown in FIGS. 4 to 8, each of the components 13' of the connecting member 13 has two thermal conditioning means such as resistance 29 and 30 which make it possible to respectively adjust the temperatures of downstream surface 15 and upstream surface 16. Component 13', located at the end of the connecting part 13, comprises, on the external side, an additional resistance 31 which makes it possible to independently adjust the temperature of the edges of the glass strip 25. Surface 16, inclined backwards, is bounded by solid parts 32 on which arms 18 bear and has at its lowest point a vertical port 33 issuing downwards.

Figure 9:
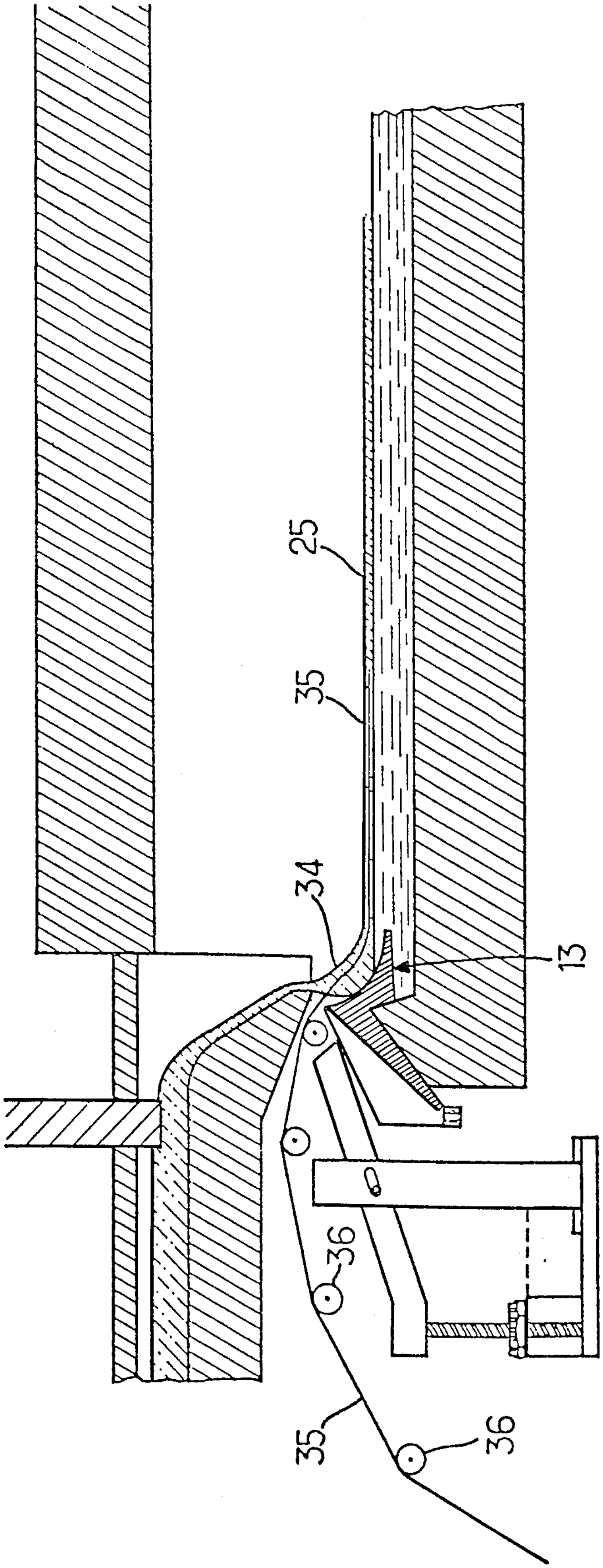
FIG. 9 is a sectional view of the overflow-shoot and the upstream part of the floating bath with a device for introducing a grid or longitudinal wires.

FIG. 9 shows a modified embodiment where a grid of longitudinal wires 35 are fed by rollers 36 into bulb 36 and then into strip 25. In this embodiment, the casting arms 24 are not used for directing the wires into proper position on the glass.

I claim:

1. In the method for the production of flat glass in which a molten glass vein is directed from a melting furnace onto a molten metal bath having a specific gravity greater than that of the glass to form a glass strip floating on the surface of the bath by causing it to fall freely through a falling zone from a height spaced above the bath and glass strip and is thereafter fed horizontally along the surface of the bath as it is being cooled and is finally removed at a predetermined exit velocity at the downstream end of the bath as a glass strip having a predetermined width and thickness, the improvement comprising:

(a) feeding the molten glass into the falling zone at a rate to form a bulb of molten glass along a deflecting surface located at the upper surface of the bath and through which the glass flows in passing from the freely falling state to the surface of the bath and to produce a horizontal component of movement in the glass as it passes through the bulb, which component extends in the same direction as the direction of movement of the glass strip on the surface of the bath.

2. The improvement in the production of flat glass according to claim 1, further comprising:

(a) forming the vein to a width substantially equal to said predetermined width prior to its free fall.

3. The improvement in the production of flat glass according to claim 2, wherein:

(a) the component of movement in the direction of movement of the glass along the surface of the bath is at a velocity about equal to said exit velocity of the glass from the bath.

4. The improvement in the production of flat glass according to claim 3 wherein:

(a) the glass vein is allowed to fall freely from a height ranging from 20 to 100 mm. above said bath.

5. The improvement in the production of glass according to claim 3, further comprising:

(a) stretching the glass longitudinally on the bath thus decreasing its thickness to one which is substantially less than that of the vein in free fall.

6. In the method for the production of flat glass in which a molten glass vein is poured from a melting furnace onto a molten metal bath having a specific gravity greater than that of the glass by causing it to fall freely from a height above the bath and is thereafter fed horizontally along the surface of the bath as it is being cooled and is finally removed at a predetermined exit velocity at the downstream end of the bath as a glass strip having a predetermined width and thickness, the improvement comprising:

(a) dividing the vein of falling glass into two layers, one layer being that which includes the upper surface of the glass as it exits from the melting furnace;

(b) producing a component of movement in the one layer which component extends in the direction of movement of the glass on the surface of the bath;

(c) directing the one layer onto the surface of the bath; and (d) directing the other layer away from the bath.

7. The improvement in the production of glass according to claim 6, further comprising:

(a) adjusting the temperature of the glass crosswise and longitudinally during its flow prior to it contacting the metal bath with the temperatures adjustment being effected independently in the marginal zones and central zones of the vein.

8. The improvement in the production of glass according to claim 8, further comprising:

(a) holding the edges of the glass sheet at the surface of the bath at a substantially constant separation from the initial contact with the bath and until the glass leaves the bath as a strip.

9. The improvement in the production of glass according to claim 8 wherein:

(a) the edges of the glass vein are held until the latter reaches a viscosity ranging from $10^5$ to $10^6$ poises.

10. The improvement in the production of glass according to claim 9 wherein:

(a) the edges of the glass vein are held in a continuous manner as the glass is fed along the surface of the bath.

11. In an apparatus for the production of flat glass in which a molten glass vein is poured from a melting furnace onto a molten metal bath having a specific gravity greater than that of the glass by causing it to fall freely from a height above the bath and is thereafter fed horizontally along the surface of the bath as it is being cooled and is finally removed at a predetermined exit velocity at the downstream end of the bath as a glass strip having a predetermined width and thickness, the improvement comprising:

(a) a connecting member emerging out of said bath with the point of emergence being generally directly below the freely falling glass, said connecting member having an inclined forward surface facing in the direction of movement of the glass on the surface of the bath for receiving the freely falling glass at the level of the surface of the bath to give it a component of movement in the said direction.

12. The improvement in the production of flat glass according to claim 11 wherein:

(a) the connecting member is disposed at a predetermined distance below the height at which the glass begins its free fall and at a predetermined angle of inclination to produce a velocity of said component of movement in the direction of movement of the glass along the surface of the bath about equal to said exit velocity of said glass from the bath.

13. The improvement in the production of flat glass according to claim 12 wherein:

(a) the connecting member is disposed at a distance ranging from 0 to 60 mm below the height at which the glass begins its free fall.

14. The improvement in the production of flat glass [illegible]ing to claim 13 wherein:

(a) the connecting member is disposed at angle of inclination ranging from 40° to 50°.

15. The improvement in the production of flat glass according to claim 11, further comprising:

(a) thermal conditioning means on said connecting member for controlling the temperature thereof.

[illegible]. The improvement in the production of flat glass [illegible]ding to claim 15, further comprising:

[illegible]eans for independently adjusting the tempera[illegible] the edge and central zones of the connect[illegible] member.

[illegible]provement in the production of flat glass [illegible] to claim 15 wherein:

[illegible]cting member is constructed of compo[illegible] of refractory material placed side by [illegible]

[illegible] member includes means for inde[illegible] the temperature thereof.

[illegible] the production of flat glass [illegible] further comprising:

[illegible] at either end of the con[illegible] the width of the [illegible] member; and

[illegible] of flat glass [illegible]

[illegible] the production of flat glass [illegible]herein:

[illegible] the casting hands is equal to [illegible] freely falling vein of glass.

[illegible]ement in the production of flat glass [illegible] claim 18, further comprising:

[illegible] for engaging the edges of the glass vein to [illegible] and

[illegible]troducing the guides into the edges of [illegible]

[illegible]provement in the production of flat glass [illegible] claim [illegible] wherein:

[illegible] are wires of refractory material.

[illegible] for introducing said wires into the [illegible] glass direct the wires into the glass [illegible] upon its arrival on the connecting [illegible]

24. The improvement in the production of flat glass according to claim 23 wherein:

(a) the means for introducing the wires into the edges of the glass extent through said casting hands.

25. In an apparatus for the production of flat glass in which a molten glass vein is poured from a melting furnace onto a molten metal bath having a specific gravity greater than that of the glass by causing it to fall freely from a height above the bath and is thereafter fed horizontally along the surface of the bath as it is being cooled and is finally removed at a predetermined exit velocity at the downstream end of the bath as a glass strip having a predetermined width and thickness, the improvement comprising:

(a) a connecting member with the point of emergence out of said bath being generally directly below the freely falling glass, said connecting member having:

(1) an inclined forward surface facing in the direction of movement of the glass on the surface of the bath for receiving the freely falling glass to give it a component of movement in said direction; and ([illegible]) [illegible]clined rearward surface intersecting the for[illegible] surface along a ridge extending along and [illegible] with the freely falling vein of glass.

[illegible]. The improvement in the production of flat glass [illegible] to claim 25, further comprising:

[illegible] for adjusting the position of the connecting [illegible] direction perpendicular to the freely [illegible] adjusting the position [illegible] with respect to the falling glass.

[illegible] which a molten glass [illegible] is poured from [illegible] melting [illegible] molten metal bath having a specific grav[illegible] greater than that of the glass by causing [illegible] bath and is thereafter fed [illegible] bath is [illegible] being [illegible] predetermined exit [illegible] glass [illegible] predetermined width and thickness, the [illegible]

[illegible] member emerging [illegible] glass, said connect[illegible] member having [illegible] inclined forward concave [illegible] direction of movement [illegible] surface of the bath for receiving the [illegible] falling glass to form a drawing [illegible] and to give it a component of movement [illegible] direction.

UNITED STATES PATENT AND TRADEMARK OFFICE
CERTIFICATE OF CORRECTION

PATENT NO. : 4,116,660

DATED : September 26, 1978

INVENTOR(S) : Michel Zortea

It is certified that error appears in the above-identified patent and that said Letters Patent are hereby corrected as shown below:

Col. 2, line 48, "path" should read --both--;
line 66, "until its" should read --until it--.

Col. 3, line 52, "of a constituent" should read --of constituent--.

Col. 5, line 69, "knive" should read --knife--.

Col. 6, line 1, "mibht" should read --might--.

Col. 7, line 2, "onto operation" should read --into operation--;
line 5, "resistance 29 and 30" should read --resistances 29 and 30--.

Col. 8, line 21, "claim 8" should read --claim 6--;
line 53, "in the said" should read --in said--.

Col. 9, line 24, "member; and" should read --member.--;
line 48, "material." should read --material;--.

Signed and Sealed this

*Twelfth* Day of *June 1979*

[SEAL]

*Attest:*

RUTH C. MASON
*Attesting Officer*

DONALD W. BANNER
*Commissioner of Patents and Trademarks*